United States Patent
McCracken et al.

(10) Patent No.: US 8,114,340 B2
(45) Date of Patent: Feb. 14, 2012

(54) METHOD OF FORMING ANODE BODIES FOR SOLID STATE CAPACITORS

(75) Inventors: Colin McCracken, Sinking Springs, PA (US); Nigel Patrick Grant, Galmpton Brixham (GB)

(73) Assignee: AVX Corporation, Myrtle Beach, SC (US)

( * ) Notice: Subject to any disclaimer, the term of this patent is extended or adjusted under 35 U.S.C. 154(b) by 829 days.

(21) Appl. No.: 12/064,255

(22) PCT Filed: Sep. 1, 2006

(86) PCT No.: PCT/GB2006/003250
§ 371 (c)(1),
(2), (4) Date: Aug. 20, 2008

(87) PCT Pub. No.: WO2007/026165
PCT Pub. Date: Mar. 8, 2007

(65) Prior Publication Data
US 2009/0193637 A1   Aug. 6, 2009

(30) Foreign Application Priority Data
Sep. 2, 2005   (GB) .................................. 0517952.8

(51) Int. Cl.
*B22F 1/00* (2006.01)
*B22F 1/02* (2006.01)
(52) U.S. Cl. ........................................... 419/20; 419/42
(58) Field of Classification Search .................... 419/20, 419/42
See application file for complete search history.

(56) References Cited

U.S. PATENT DOCUMENTS

| | | | | |
|---|---|---|---|---|
| 3,021,594 A | * | 2/1962 | Segal et al. | ...................... 29/424 |
| 3,132,379 A | * | 5/1964 | Crane | .............................. 425/78 |
| 3,345,545 A | | 10/1967 | Bourgault et al. | |
| 4,084,965 A | | 4/1978 | Fry | |
| 4,118,727 A | | 10/1978 | Laplante | |
| 4,149,876 A | | 4/1979 | Rerat | |

(Continued)

FOREIGN PATENT DOCUMENTS

CN   1549286   11/2004
(Continued)

OTHER PUBLICATIONS

Machine tranlsation of CN 1565779 A published Jan. 19, 2005.*

(Continued)

*Primary Examiner* — George Wyszomierski
*Assistant Examiner* — Tina M McGuthry Banks
(74) *Attorney, Agent, or Firm* — Dority & Manning, P.A.

(57) ABSTRACT

The present invention relates to the field of solid state capacitors, and in particular to capacitors that have an anode body formed of porous valve action material, such as tantalum, niobium or niobium monoxide. According to one aspect of the present invention, there is provided a method of forming capacitor anode bodies from valve action material comprising the steps of: providing a capacitor grade powder of the valve action material, charging the powder into a press mold, compacting the powder in the mold so as to shape the powder into an anode body shape, stabilizing the body shape, for example by sintering of the material to form an inter-connected porous body, characterized in that the molding process involves the use of a lubricant applied locally to lubricate the interface between an outside surface of the anode body and a molding surface of the mold.

17 Claims, 5 Drawing Sheets

U.S. PATENT DOCUMENTS

| | | | |
|---|---|---|---|
| 4,722,756 | A | 2/1988 | Hard |
| 4,910,645 | A | 3/1990 | Jonas et al. |
| 4,957,541 | A | 9/1990 | Tripp et al. |
| 5,098,485 | A | 3/1992 | Evans |
| 5,198,187 | A | 3/1993 | Lu et al. |
| 5,306,479 | A | 4/1994 | Sommers |
| 5,357,399 | A | 10/1994 | Salisbury |
| 5,432,223 | A | 7/1995 | Champagne et al. |
| 5,457,862 | A | 10/1995 | Sakata et al. |
| 5,470,525 | A * | 11/1995 | Tripp et al. ............... 419/36 |
| 5,473,503 | A | 12/1995 | Sakata et al. |
| 5,495,386 | A | 2/1996 | Kulkarni |
| 5,729,428 | A | 3/1998 | Sakata et al. |
| 5,812,367 | A | 9/1998 | Kudoh et al. |
| 5,949,639 | A | 9/1999 | Maeda et al. |
| 5,993,513 | A | 11/1999 | Fife |
| 6,051,044 | A | 4/2000 | Fife |
| 6,072,694 | A | 6/2000 | Hahn et al. |
| 6,115,235 | A | 9/2000 | Naito |
| 6,165,623 | A | 12/2000 | Fife et al. |
| 6,312,642 | B1 | 11/2001 | Fife |
| 6,322,912 | B1 | 11/2001 | Fife |
| 6,338,816 | B1 | 1/2002 | Fife |
| 6,344,169 | B2 * | 2/2002 | Tsuchida et al. ............... 419/38 |
| 6,365,094 | B1 | 4/2002 | Hinzmann et al. |
| 6,373,685 | B1 | 4/2002 | Kimmel et al. |
| 6,375,704 | B1 | 4/2002 | Habecker et al. |
| 6,391,275 | B1 | 5/2002 | Fife |
| 6,402,066 | B1 | 6/2002 | Habecker et al. |
| 6,416,730 | B1 | 7/2002 | Fife |
| 6,420,043 | B1 | 7/2002 | Fife et al. |
| 6,455,443 | B1 | 9/2002 | Eckert et al. |
| 6,462,934 | B2 | 10/2002 | Kimmel et al. |
| 6,517,645 | B2 | 2/2003 | Fife |
| 6,522,527 | B2 | 2/2003 | Kojima et al. |
| 6,527,937 | B2 | 3/2003 | Fife |
| 6,563,695 | B1 | 5/2003 | Suzuki et al. |
| 6,576,099 | B2 | 6/2003 | Kimmel et al. |
| 6,592,740 | B2 | 7/2003 | Fife |
| 6,616,728 | B2 | 9/2003 | Fife |
| 6,639,787 | B2 | 10/2003 | Kimmel et al. |
| 6,674,635 | B1 | 1/2004 | Fife et al. |
| 6,702,869 | B2 | 3/2004 | Habecker et al. |
| 6,706,240 | B2 | 3/2004 | Habecker et al. |
| 6,759,026 | B2 | 7/2004 | Kimmel et al. |
| 6,821,314 | B1 | 11/2004 | Reichert et al. |
| 6,835,225 | B2 | 12/2004 | Naito et al. |
| 6,987,663 | B2 | 1/2006 | Merker et al. |
| 7,025,795 | B2 | 4/2006 | Monden et al. |
| 7,116,548 | B2 | 10/2006 | Satterfield, Jr. et al. |
| 7,125,764 | B2 | 10/2006 | Taketani et al. |
| 7,149,074 | B2 | 12/2006 | Kimmel et al. |
| 7,154,740 | B2 | 12/2006 | Merker et al. |
| 7,156,893 | B2 | 1/2007 | Habecker et al. |
| 7,157,073 | B2 | 1/2007 | Motchenbacher et al. |
| 7,220,397 | B2 * | 5/2007 | Kimmel et al. ............ 423/592.1 |
| 7,241,436 | B2 | 7/2007 | Fife |
| 7,341,705 | B2 | 3/2008 | Schnitter |
| 7,595,235 | B2 * | 9/2009 | Arai et al. ............... 438/215 |
| 2005/0013765 | A1 | 1/2005 | Thomas et al. |
| 2005/0103638 | A1 | 5/2005 | Schnitter et al. |
| 2005/0150576 | A1 | 7/2005 | Venigalla |
| 2005/0199321 | A1 | 9/2005 | Spaniol |
| 2007/0072362 | A1 | 3/2007 | Tseng et al. |
| 2007/0121276 | A1 | 5/2007 | Uzawa et al. |

FOREIGN PATENT DOCUMENTS

| | | |
|---|---|---|
| CN | 1565779 | 1/2005 |
| EP | 0688030 A1 | 12/1995 |
| EP | 0698435 A1 | 2/1996 |
| EP | 1598841 A1 | 11/2005 |
| EP | 1713103 A1 | 10/2006 |
| JP | 4237110 A | 8/1992 |
| JP | 8100203 A | 4/1996 |
| JP | 2000144208 A | 5/2000 |
| SU | 1057995 A | 11/1983 |
| WO | WO 9738143 A1 | 10/1997 |
| WO | WO 9819811 A1 | 5/1998 |
| WO | WO 9830348 A1 | 7/1998 |
| WO | WO 9838660 A1 | 9/1998 |
| WO | WO 0015555 A1 | 3/2000 |
| WO | WO 0111638 A1 | 2/2001 |
| WO | WO 0245107 A1 | 6/2002 |
| WO | WO 2005076297 A1 | 8/2005 |
| WO | WO 2007020458 A1 | 2/2007 |
| WO | WO 2007020464 A1 | 2/2007 |
| WO | WO 2007026165 A1 | 3/2007 |

OTHER PUBLICATIONS

Abstract of Canadian Patent No. CA 2 018 346 dated Dec. 8, 1990.
Abstract of Japanese Patent No. JP1176226 dated Jul. 12, 1989.
Abstract of Japanese Patent No. JP2038501 dated Feb. 7, 1990.
Abstract of Japanese Patent No. JP3023222 dated Jan. 31, 1991.
Abstract of Japanese Patent No. JP3053511 dated Mar. 7, 1991.
Abstract of Japanese Patent No. JP4026709 dated Jan. 29, 1992.
Abstract of Japanese Patent No. JP4070594 dated Mar. 5, 1992.
Abstract of Japanese Patent No. JP53092977 dated Aug. 15, 1978.
*Change in Porous Structure and Leakage Currents of Niobium Capacitor Anodes During Electrolytic Oxidation*, Levinskiy, et al., Poroshkovaya Metallurgiya, No. 3, 1991, pp. 56-59.
*Charge Carrier Transport and Storage in NbO Capacitors*, Sikula et al., CARTS Europe, Oct. 21, 2004, 4 pages.
*Conductivity Mechanisms and Breakdown Characteristics of Niobium Oxide Capacitors*, Sikula et al., AVX Corporation 2003, 5 pages.
*Conductivity Mechanisms and Breakdown of NbO Capacitors*, Sikula et al., CARTS USA, Mar. 19, 2004, 7 pages.
*Electrolytic Capacitors*, Electrochemical Society Reviews and News, vol. 24, No. 12, Dec. 1977, pp. 408C-409-C.
*Extended Range NbO Capacitors Through Technology and Materials Enhancements*, Zednicek, et al., CARTS USA, Mar. 24, 2005, 5 pages.
*Intrinsically Electrically Conductive Polymers (ICPs) from Plastics Materials* by J. A. Brydson, 7th Edition, 1999, pp. 886-889.
*Investigation of Columbium as an Electrolytic Capacitor Anode, Part II*, Peabody, U.S. Army Signal Research and Development Laboratory, Fort Monmouth, NJ, DA Task NR. 3A99-15-003-04, 1962, pp. 1-11.
*Low ESR and Low Profile Technology on Niobium Oxide*, Zednicek et al., AVX Corporation 2003, 9 pages.
*NbO Capacitor Parameters Improvement, Leakage Current Mechanism and Anodic Oxidation*, Šikula et al., Mar. 30, 2005, 7 pages.
*New Tantalum Technologies, Tantalum Polymer, and Niobium Oxide Capacitors*, T. Zedníček, CARTS Europe Prague, Oct. 19, 2005, 7 pages.
*Niobium Oxide and Tantalum Capacitors: M-I-S Model Parameters Comparison*, Sikula et al., CARTS USA, Mar. 24, 2005, 4 pages.
*Niobium Oxide set to beat the pants off tants*, CIE (Components in Electronics), Aug. 2007.
*Niobium Oxide Technology Roadmap*, Zednicek et al., AVX Corporation, T. Zednicek et al., CARTS Europe Nice, Oct. 15, 2002, 5 pages.

\* cited by examiner

METHOD OF FORMING ANODE BODIES FOR SOLID STATE CAPACITORS

RELATED APPLICATIONS

This application is a 371 of PCT/GB06/03250 filed Sep. 1, 2006.

The present invention relates to the field of solid state capacitors, and in particular to capacitors that have an anode body formed of porous valve action material, such as tantalum, niobium or niobium monoxide.

It is known to manufacture solid state capacitors by carrying out the following steps: 1) forming a porous anode body from valve action material such as tantalum, 2) forming a dielectric layer on an exposed surface of the anode body, 3) forming a cathode layer on the dielectric layer and 4) forming a cathode terminal in electrically conducting contact with the cathode layer and an anode terminal in electrically conducting contact with the anode body. The anode terminal may comprise a tantalum wire embedded in the anode and having a free end protruding from the capacitor.

The use of a porous anode body provides a very high surface area per unit volume of capacitor, and allows the production of very small, high capacitance capacitors. In a typical prior art method, the anode body is formed by providing "green" mixture of powdered tantalum powder admixed with a binder/lubricant such as a fatty acid. The mixture is formed into shape in a mould. The anode may in certain embodiments be moulded around a conducting lead wire (formed of a compatible material such as tantalum wire), which subsequently serves as an anode terminal of the capacitor. The green anode body is then sintered by heating to a temperature below the melting point, but at which touching asperities in the powder fuse to form an interconnected porous matrix. The binder/lubricant is burnt off during sintering, or may need to be dissolved from the green body prior to firing by leeching in a caustic solution, such as sodium hydroxide. This leeching method is preferred over the burn off alternative, as the presence of carbon residues formed during burn off can prevent a useful capacitor being formed. Such a leeching method is described in our PCT publication WO 98/30348. Nevertheless residual carbon contaminants from binder/lubricant materials can cause performance problems and failures in the final capacitors.

U.S. Pat. No. 5,357,399 discloses a method for manufacturing multiple solid state capacitors on a wafer substrate. The individual anode bodies are formed by machining an array of channels in a porous layer of valve action material sintered onto the substrate. In a variation on this method, WO01/11638 discloses a method of forming the anode bodies on the substrate in which a plurality of dies and corresponding punches are used to shape and locate moulded anode bodies on the substrate, thereby obviating the need for a machining step.

Recently, niobium has become a useful alternative to tantalum in capacitor anode materials. This use arises from the cheap availability of niobium material of sufficient purity by reduction of niobium pentoxide to the elemental state (oxidation number=0). Niobium powders, and capacitors made therefrom, are disclosed in EP-A-0946 323.

More recently, niobium sub-oxide, in particular the monoxide, has been proposed as a capacitor anode material. NbO is formed by reduction of the pentoxide in the presence of metal niobium and a reducing agent such as hydrogen. The metal is oxidised to the monoxide state, while the pentoxide is reduced. This method, and capacitors formed from the monoxide, is disclosed in EP-A-1115658. The monoxide has metallic properties, and also valve action capability, including the ability to form a dielectric layer of pentoxide thereon so as to permit ready growth of a dielectric layer for use in solid state capacitors.

As used herein, the capacitor grade niobium sub-oxides refer not just to the stoichiometric $Nb_{(I)}O_{(I)}$ monoxide form but generally include oxides having a composition $NbO_x$ wherein $0.7<x<1.3$. Advantageously, the niobium oxide powder or anode body may have a bulk nitrogen content of 500 to 20000 ppm, preferably 1000 to 8000 ppm. The nitrogen may be present as $Nb_2N$ crystals in the bulk material.

Tantalum powders continue to be developed for use in high performance capacitors, requiring higher surface area (CV/g) and higher breakdown voltages (BDV). In the development of higher surface area, the primary powder particle size decreases. This may deleteriously affect the physical processing characteristics, including ease of flow, Scott (bulk) density and green (raw) strength and inter-agglomerate strength. Furthermore, post green forming strength during binder removal (brown strength) is also affected, along with sintered crush strength.

In order to reduce the negative impact of these physical characteristics new techniques are required to assist in the fabrication of porous anode bodies prior to sinter and electrolytic formation.

In forming anode bodies by moulding of anode material powder, the use of binders creates problems related to successful and complete removal of the binder during subsequent processing. Conventional moulding processes require the use of a binder/lubricant so as to provide green anode body pellets with structural integrity, and to lubricate the moulding and release from the mould. A complete absence of lubricant/binder can lead to the anode bodies cracking or collapsing after green forming in a mould press.

The present invention seeks to provide a method of forming anode bodies which permits the use of less binder-lubricant, without causing excessive wear of moulding apparatus, or failure of anode bodies due to lack of lubricant.

According to one aspect of the present invention, there is provided a method of forming capacitor anode bodies from valve action material comprising the steps of:
  providing a capacitor grade powder of the valve action material,
  charging the powder into moulding means,
  compacting the powder in the moulding means so as to shape the powder into an anode body shape,
  stabilising the body shape, for example by sintering of the material to form an inter-connected porous body,
  characterised in that the moulding process involves the use of lubrication means which is adapted to apply lubricant locally to lubricate the interface between an outside surface of the anode body and a surface of the moulding means.

By applying a lubricant directly to the parts of the mould and anode green that most require lubricant, it is possible considerably to reduce the amount of binder/lubricant that must be added to the valve action powder. In fact, in the case of tantalum, it has surprisingly been found that it is possible to avoid completely the need for an admixed binder/lubricant. This is thought to be because the compaction of the tantalum powder in the presence of an external lubricant provides sufficient structural integrity of the green to be manipulated and transported to a sintering station, without disintegrating.

For materials where structural integrity is still lacking, smaller amounts of binder/lubricant may be used. This is easier to remove and therefore less likely to contaminate the anode during subsequent processing, in particular sintering.

This method also permits the processing of abrasive material such as powder grades of material which would otherwise tend to damage the moulding apparatus over time. Niobium monoxide is one example of a material which is highly abrasive, and for which the use of an externally applied lubricant prevents accelerated wear of the moulding apparatus.

The lubricant is preferably a liquid such as an oil. A preferred lubricant is PEG 400 (polyethylene glycol 400). Alternatively, the lubricant may be a material capable of forming a liquid under operating pressures or temperatures, such as a wax.

The lubrication means may be adapted to apply lubricant to the moulding means by a capillary feed or by gravity feed, or preferably a combination of these.

The liquid lubrication means may comprise a contact depot which provides a lubricant contact surface which is a source of lubricant for the moulding means. In one embodiment, the lubricant is a liquid and the depot is occupied by a material which holds adsorbed lubricant, e.g. a fibrous material such as a felt or a woven textile, or a porous cellular material such as a sponge.

In a preferred arrangement, the lubricant contact surface is contacted by a travelling member of the moulding means, which travelling member travels relative to the lubricant contact surface and enters into a moulding cavity, thereby to transport lubricant onto a moulding cavity surface.

The moulding means may comprise a die and punch combination in which the die defines a cross-section configuration of the anode body and the punch acts to compact material in the die. In an optimum arrangement the punch further acts to eject the compacted and formed anode body from the die in a separate motion.

In another aspect of the invention, the travelling member is the punch. In this way the punch is used to pick up and deliver oil into the mould. The anode body is lubricated by contact with the lubricant-wetted mould surfaces.

The compacted anode body, once formed, is stabilised by sintering after ejection of the anode body from a mould and transport of the body to a sintering station in the manufacture process.

In another aspect of the invention, the valve action powder compacted in the moulding means is not provided with an admixed lubricant, so that substantially the entire lubrication during moulding is provided by the locally applied lubrication means.

In yet another aspect of the invention, the valve action powder may be provided with an admixed additional lubricant, so that lubrication during moulding is provided by the locally applied lubrication means and by the additional admixed lubricant.

The valve action material comprises tantalum metal or niobium metal or a conductive niobium sub-oxide, such as niobium monoxide.

In a preferred arrangement, the moulding means comprises multiple die and punch pairs, whereby multiple anode bodies may be formed in parallel on the same apparatus.

The method of the present invention is intended to be incorporated into a method of manufacturing solid state capacitors from valve action material comprising the steps of: forming a porous anode body by a method as hereinbefore described, forming a dielectric layer on an exposed surface of the anode body, forming a cathode layer on the dielectric layer and forming a cathode terminal in electrically conducting contact with the cathode layer and an anode terminal in electrically conducting contact with the anode body.

Following is a description by way of example only of one mode for putting the present invention into effect with reference to the following drawings, in which:—

Figure 1:
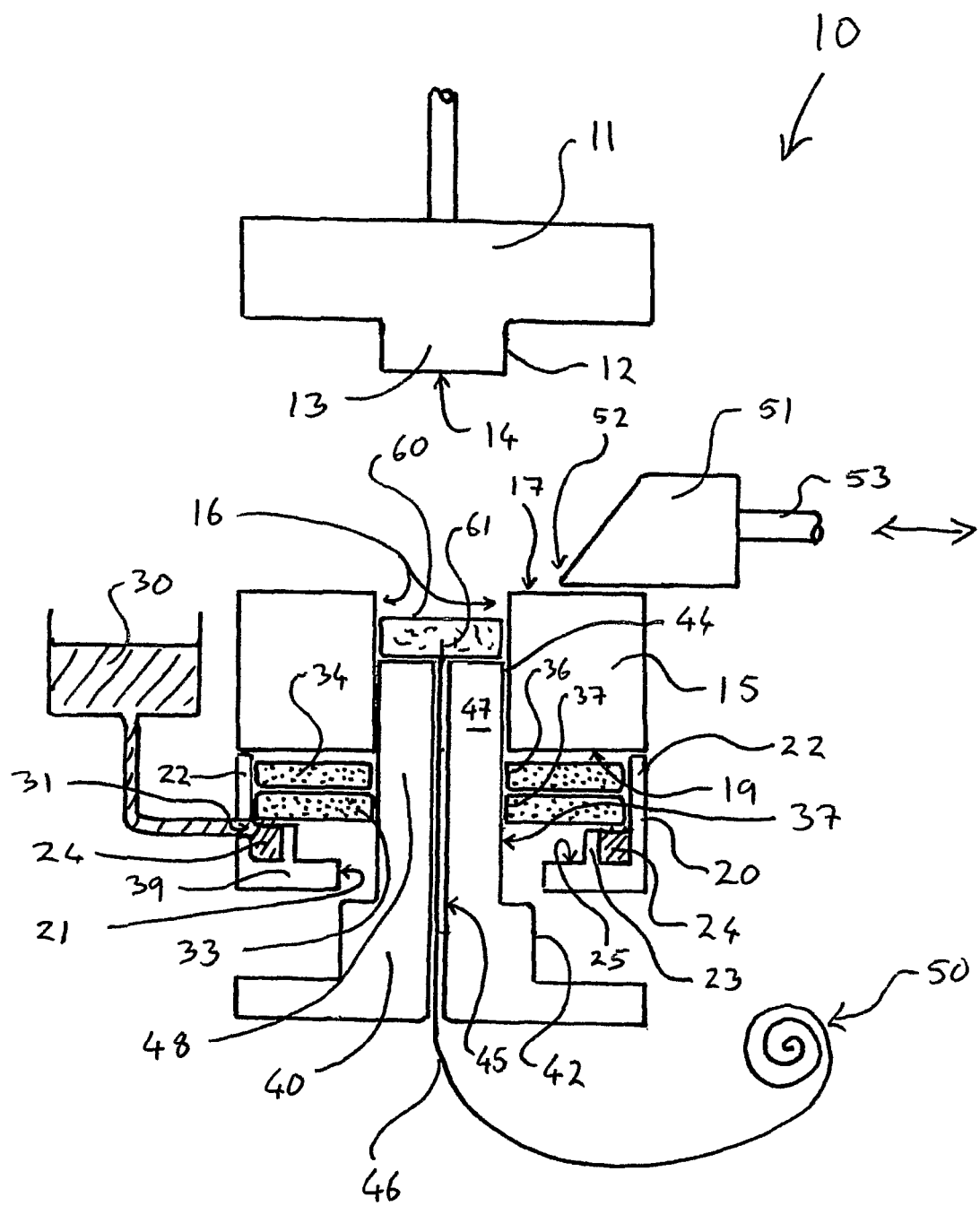
FIG. 1 is a cross sectional view from one side of apparatus for performing the present invention.

In FIG. 1 a capacitor moulding press is shown generally as 10. The press comprises an upper mould piece 11 which is a generally cylindrical piece formed of tool steel. The piece is formed with a depending annular shoulder 12 which defines a cylindrical mould upper spigot 13, having a flat moulding face 14.

A central mould die 15 is also cylindrical in shape, and formed with a central bore 16 and an upper surface 17 and a lower surface 18. The lower surface 19 of the mould die abuts a lubricant reservoir piece 20.

The reservoir is annular in form, having a central bore 21 and a raised annular rim piece 22. An inner annular rim piece 23 defines an annular channel 24 which extends around an outer edge region of an upper surface 25 of the reservoir piece. The channel serves as a reservoir for lubricant which is gravity fed from a lubricant supply 30, which enters the reservoir piece through a feed bore 31. A first annular foam capillary layer 33 is accommodated within the rim of the reservoir piece, abutting an upper side of the inner annular rim piece 23. A second annular capillary foam layer 34 is disposed abutting and overlaying a top surface of the first annular layer 35. The first layer is formed of relatively finely-pored open cell foam, whereas the second layer 34 is formed of relatively coarsely-pored open cell foam. Each of the layers is formed with a bore 35,36 which bores are in intimate sliding contact with an outer cylindrical surface 37 of a mould male punch piece 40.

The male punch piece comprises a cylindrical base piece 41, which piece is formed with an upstanding annular first shoulder 42. The first shoulder 42 may be accommodated in a bore 21 formed in a base region 39 of the reservoir piece 20. A second upstanding annular shoulder 44 defined the upper end 47 of an elongate cylindrical punch 48, which provides the outer cylindrical surface 37. The male punch piece is formed with a central upstanding axial bore 45. The bore has threaded therein an anode lead wire 46. The anode wire is in intimate sliding contact, with fine travel tolerance. The lead wire is fed from a retainer spool 50.

A guillotine shuttle 51 is arranged to slide selectively across the upper surface 17 of the central mould die 15. The shuttle is formed with a wedge form front profile which defines a guillotine point 52. The shuttle is mounted on a drive rod 53, which is may be driven to push or pull the shuttle across the mould die surface, as indicated by the motion arrows in the figure.

An anode body 60 is shown as a cylindrical pellet having buried therein an upper end region 61 of the anode lead wire 46.

Figure 2:
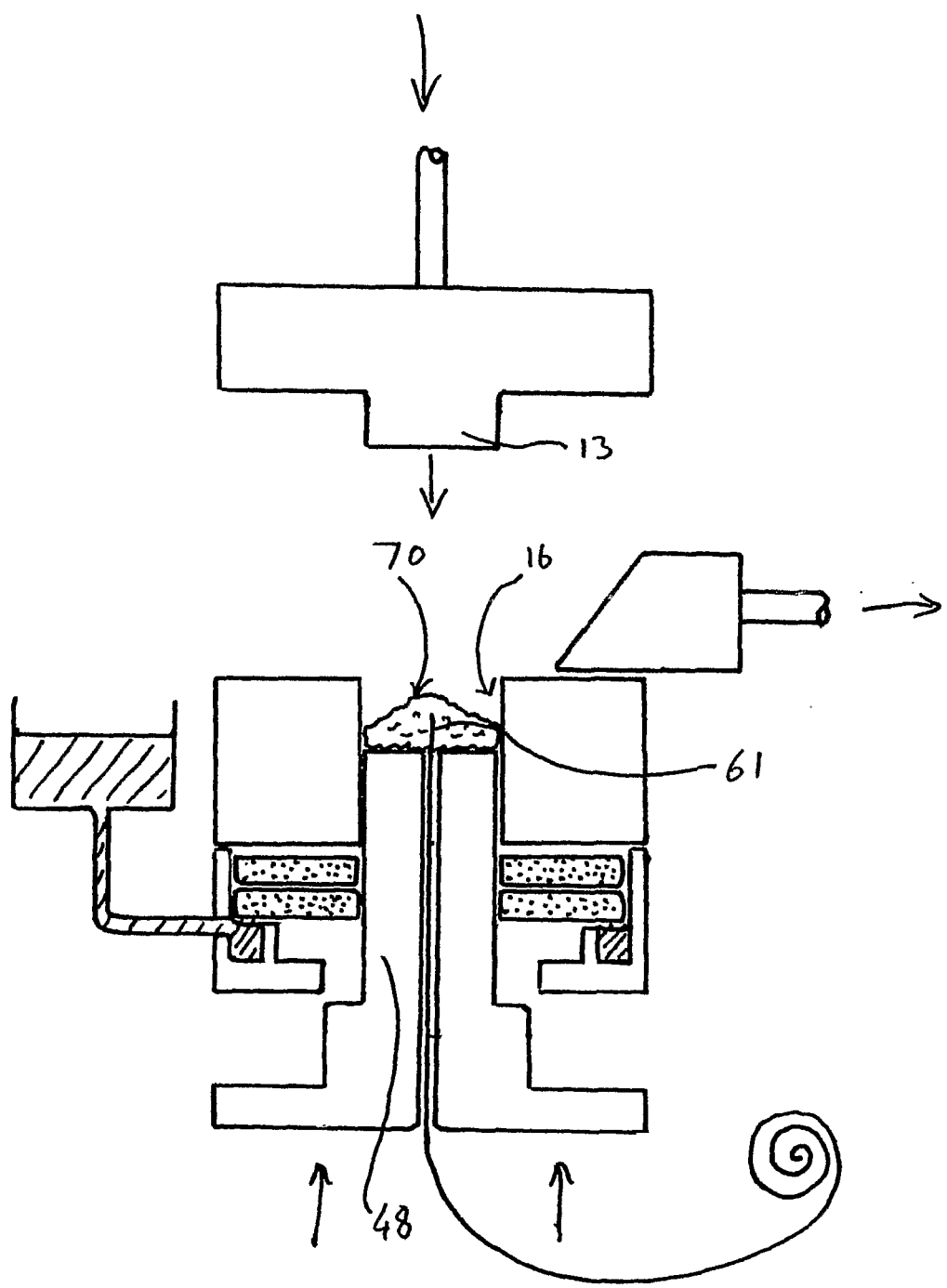
FIG. 2 shows the apparatus of FIG. 1, loaded with a charge of tantalum powder.

An operation sequence of the moulding press will now be described. As shown in FIG. 2, a charge of loose capacitor grade tantalum powder 70 is delivered into the mould die bore 16. The charge covers an upstanding lead wire free end 61. The male punch piece 48 is pushed upwards into the bore 16, taking the lead wire with it. The upper depending mould spigot 13 travels downwards into an upper end region of the bore.

Figure 3:
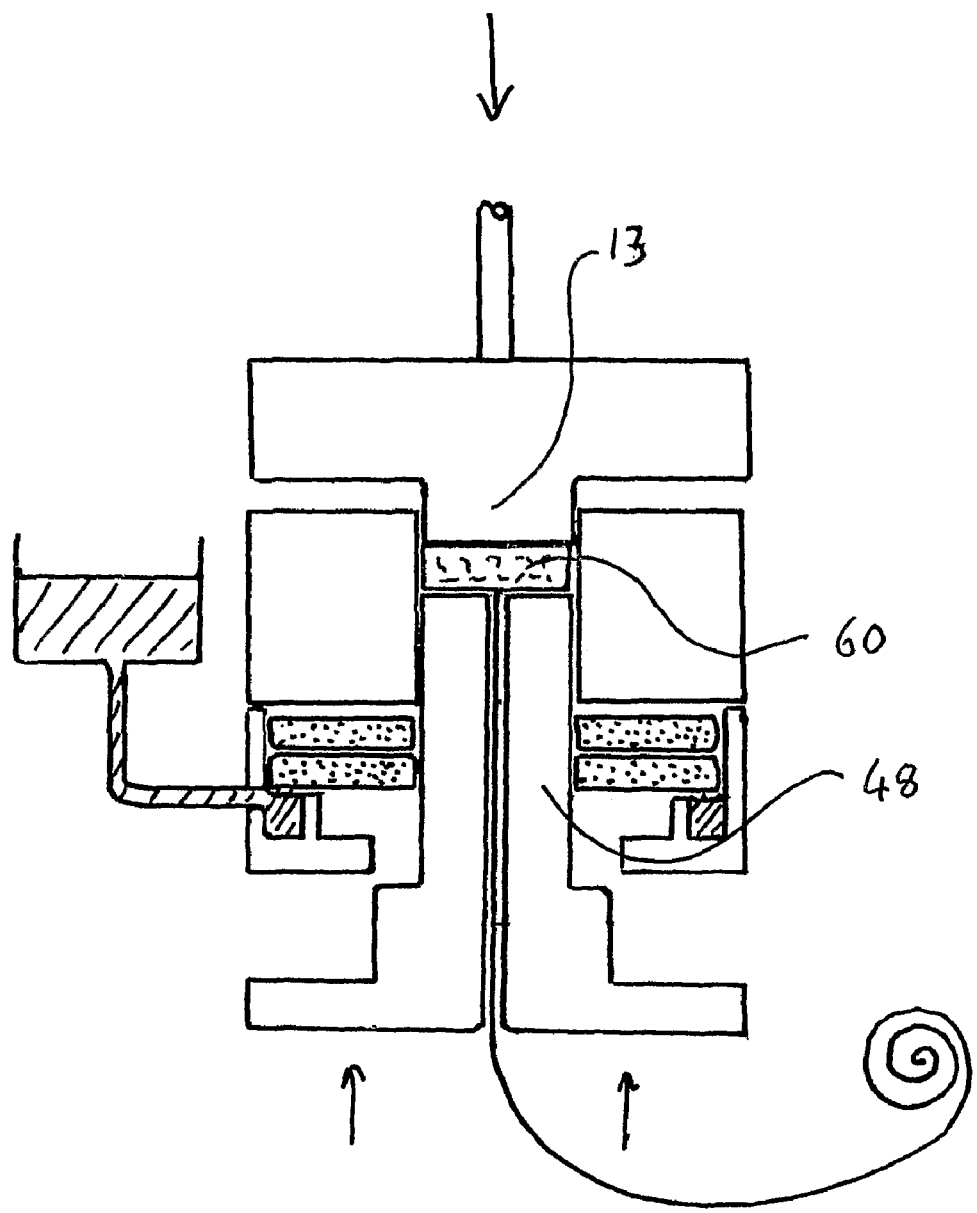
FIG. 3 shows the apparatus of FIG. 1 during a moulding stroke.

As shown in FIG. 3, the mould bore, upper spigot and punch constrain and compact the tantalum powder charge, thereby moulding a green (un-sintered) cylindrical anode body 60.

Figure 4:
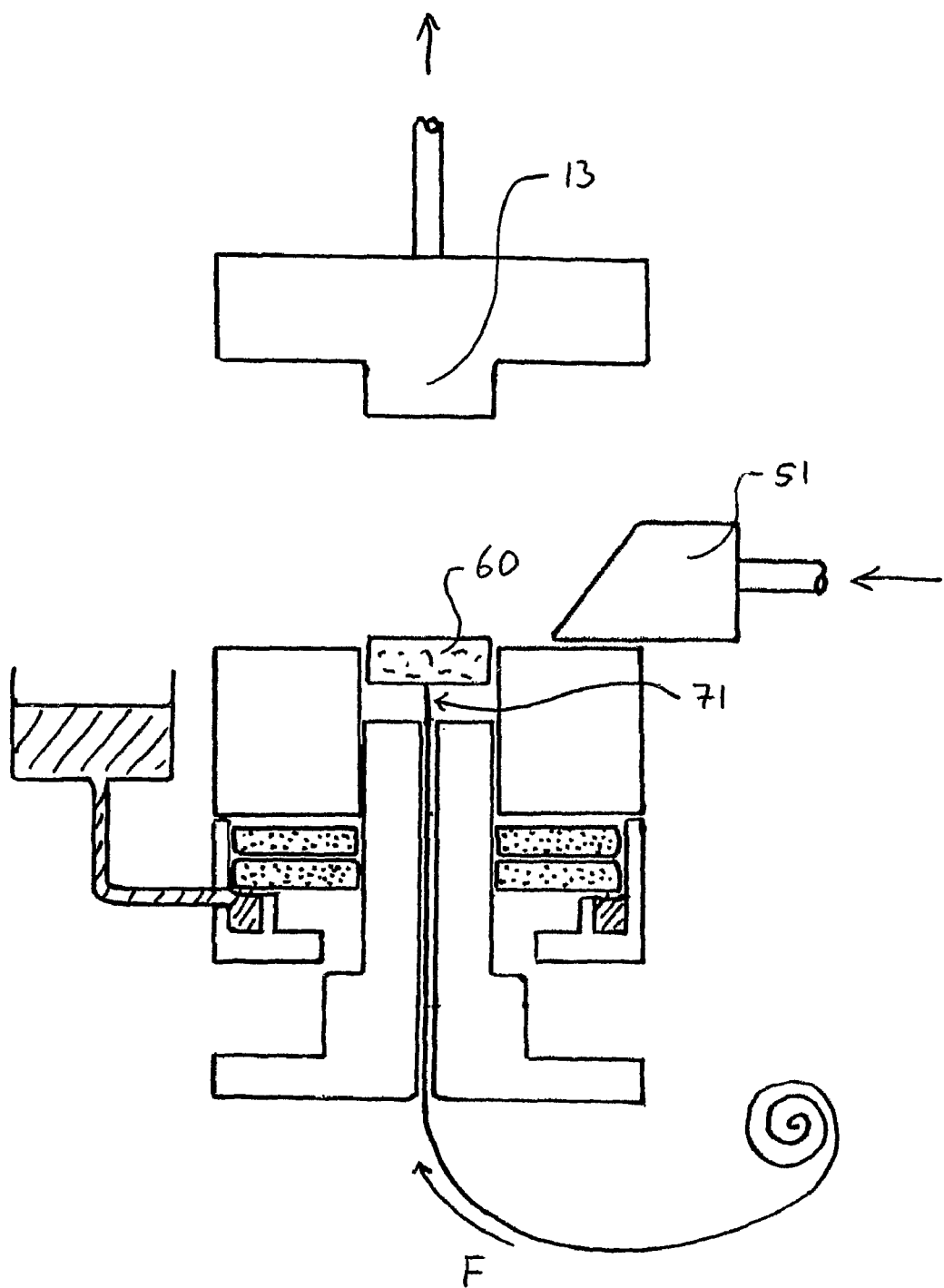
FIG. 4 shows the apparatus of figure during a wire feed stroke.

The upper spigot then retreats from the upper end region of the mould, as shown in FIG. 4. The punch travels further into the mould upwards, until an upper end of the punch is conterminous with the upper surface 17 of the mould die. A further feed F of lead wire is the actuated, which raises the green anode body 60, while exposing a stalk 71 of anode wire above the punch upper surface.

Figure 5:
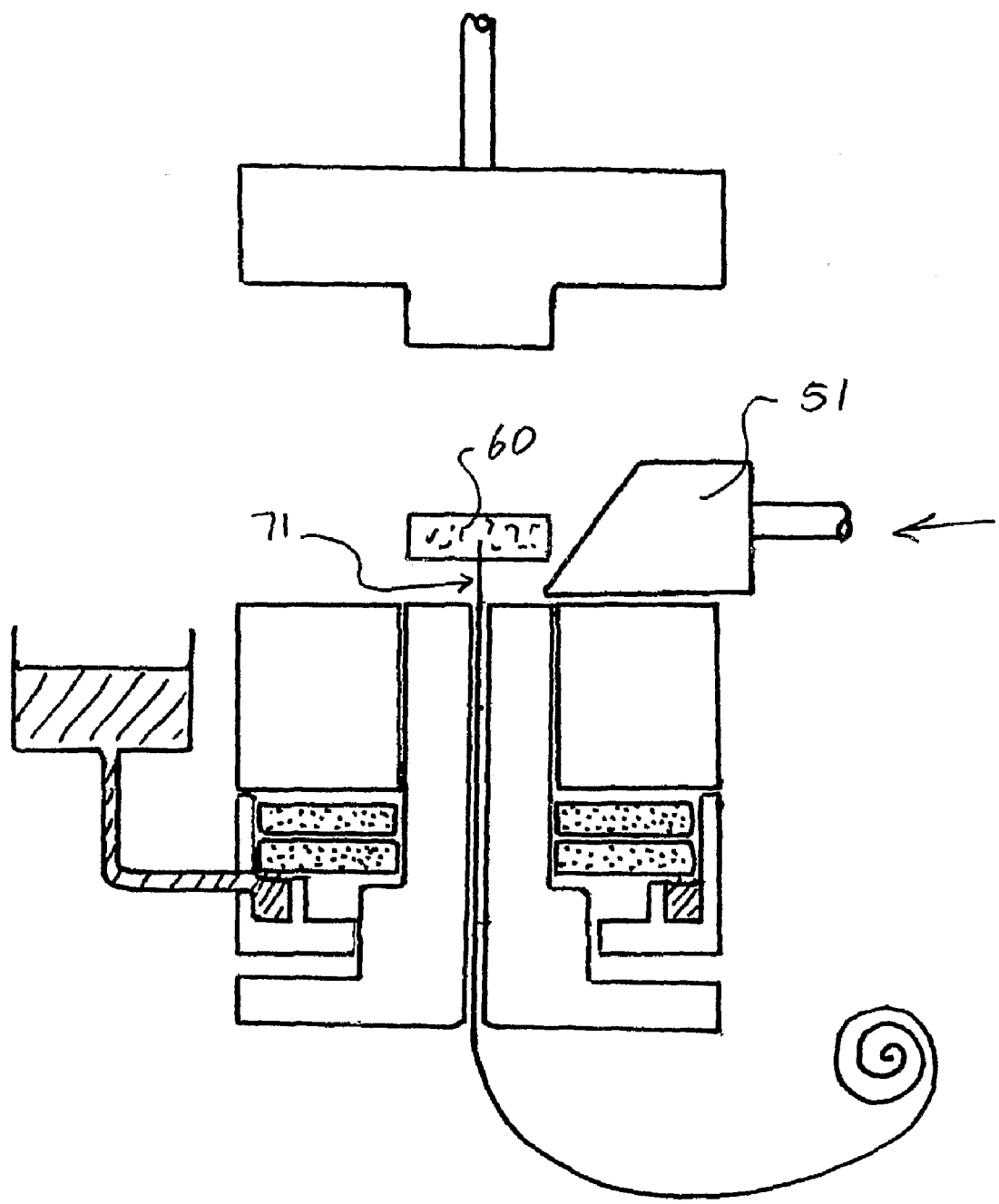
FIG. 5 shows the apparatus of FIG. 1 during a guillotine cutting stroke.

In FIG. 5, the shuttle 51 is then driven across the surface to shear the anode wire stalk 71 at its base and carry the released anode body to one side of the mould for collection (by a collection basket [not shown]).

The punch is then withdrawn to adopt the configuration shown in FIG. 2, so that the bore is ready for further charging with tantalum powder and a repeat of the cycle.

It will be appreciated that in withdrawing and punching the male punch 48, lubricant is drawn from the upper and lower foam layers 33,34 by contact with surface 36,37 and replenished from the reservoir by capillary action. The lubricant is carried up and deposited on the inner cylindrical surface 37 of the die bore 16. Thus a layer of lubricant is applied and continually replenished during the moulding cycle.

As the lubricant only contacts an outer surface region of the formed anode body, the degree of contamination of the body is limited to the surface. This surface coating of lubricant may easily be removed completely either by sintering alone, or by an initial washing followed by sintering to form the final, integrated anode body.

The present invention makes it possible to sinter anode bodies with a reduced content of binder lubricant in the powder charge. Indeed it is possible to do without the binder lubricant completely in certain cases. This allows anodes with improved properties to be produced as carbon residues from the lubricant are less likely to remain post sintering.

The use of an external lubricant during pressing of the porous anode reduces the friction between the pressed anode and the mould press (e.g. pressing tool die walls). The advantages provided can be broken down into three main categories: anode quality, electrical performance and improved cost manufacturing Anode quality impacts both electrical performance and yield. The perfect anode will be free from defects, dimensionally correct and made in high volume with good reproducibility. One of the key parameters for achieving the best anode quality is high green, brown (post binder/lubricant removal) and sintered anode crush strength. The primary advantage of adding a small amount of binder and/or lubricant to the powder mixture is to increase the flow of the mixed powder. However this normally reduces the crush strength of the mixed powder due to coating of the individual powder particles and so preventing microscopic cold welding during compaction. By removing the binder and/or lubricant the green and brown crush strength may be improved so the anode does not crack or shed powder, which in turn prevents a range of other pressing defects occurring.

The use of binders and lubricants can also cause another moulding press defect in which the mixed powder adheres to the moulding tool (e.g. punch) surfaces. The mixed powder can build up to form a dome on the punches, which results in a depression being formed on either end of the pressed anode. These depressions can lead to density and dimensional variations, which affect the overall capacitance of the finished capacitor.

Die wall lubrication on its own or used in conjunction with a lubricant/binder-admixed mixed powder can also extend the pressing capability of the powder for pressing anodes of very high aspect ratio. High aspect ratio anodes are used to made "low profile" capacitors, which offer the same performance as conventional capacitors but with a reduced overall height. Low profile capacitors are necessary in portable applications such as laptop computers and mobile telephones. High aspect ratio anodes have an increased surface area to volume ratio, but as the surface area increases the anode/die wall friction also increases. Die wall lubrication reduces this friction and increases the ability to press higher aspect ratio anodes, which the conventional state of the art does not allow.

The overall improvement in anode quality with the use of a die wall lubricant can directly and/or indirectly impact the electrical performance of the finished capacitor. Die wall lubrication can significantly reduce carbon contamination by the elimination of any binders and/or lubricants when needed to press a porous anode. Carbon residues from the removal of binders and lubricants from one of the highest sources of known contamination during capacitor manufacture. These carbon residues, if left on the anode, will defuse into the anode body during the sinter step and then be incorporated into the dielectric during capacitor formation. High carbon residue has been identified, as a well know source of high leakage current, which impacts both performance and long-term reliability.

By the careful selection of a suitable die wall lubricant such as PEG400 which is water soluble, it can be easily removed from the anode surface by washing, for example in clean water at about 80 C prior to sinter. This results in a carbon free surface.

Die wall lubrication can also be used to modify the surface roughness and texture of the pressed anode, for powders, which have low crush and/or agglomerate strength. These powders are easily deformed during pressing resulting in a smooth anode surface. A smooth anode surface is very detrimental for good capacitor manufacture as this can promote delamination of the outer cathode (MnO2) layers from the anode body, rendering the capacitor not fit for use. Using die wall lubrication on such powders reduces the tendency for the surface powder to deform, and maintains an open anode surface. This assists in the bonding of the outer MnO2 coating to the anode surface.

A key development area for capacitor manufacturers is in the production of low Equivalent Series Resistance (ESR) capacitors for use in high frequency electrical design applications. Complex (fluted) shaped anodes provide an increased external surface area and help to reduce ESR by up to ~30%. The increased surface area also increases the anode/mould wall surface friction during pressing and limits the length of anode that may be pressed successfully. Externally applied lubrication allows the pressing of longer fluted anodes to further reduce the ESR or increase the capacitance values of the finished product.

As a direct impact of using die wall lubrication and improving the pressed anode quality and dimensional control, the overall anode yield is increased. Thus fewer anode bodies are rejected saving expensive capacitor powder, and reducing labour and overhead costs per unit to manufacture. Other material savings are seen in prolonged life of the Dies as they wear less rapidly and remain within dimensional tolerance much longer.

The invention claimed is:

1. In the manufacture of solid state capacitors, a method of forming anode bodies from valve action material comprising:
   providing a powder of the valve action material, wherein the valve action material comprises tantalum metal, niobium metal, or a conductive niobium sub-oxide,
   charging the powder into a die of a press mold, wherein the press mold comprises a contact depot that provides a lubricant contact surface and is occupied by an adsorbent material that holds a lubricant therein; and
   inserting a punch into the die to compact and form the anode body and then withdrawing the punch therefrom, wherein the punch contacts the lubricant contact surface during insertion into and/or withdrawal from the die and thereby carries the lubricant into the cavity and in contact with a surface of the die where it is applied to an external surface of the anode body.

2. A method as claimed in claim 1 wherein the lubricant is a liquid.

3. A method as claimed in claim 2 wherein the lubricant is supplied via a capillary feed.

4. A method as claimed in claim 2 wherein the lubricant is supplied via a gravity feed.

5. A method as claimed in claim 1 wherein the adsorbent material includes a fibrous material.

6. A method as claimed in claim 5, wherein the fibrous material is a felt, woven textile, or sponge.

7. A method as claimed in claim 1 wherein the punch further acts to eject the compacted and formed anode body from the die.

8. A method as claimed in claim 1, wherein the valve action powder is not provided with an admixed lubricant.

9. A method as claimed in claim 1 wherein after compacting and before sintering, the anode body is washed by contacting with a leaching medium to remove lubricant.

10. A method as claimed in claim 9 wherein the leaching medium is water at above room temperature.

11. A method as claimed in claim 1 wherein the press mold comprises multiple die and punch pairs arranged to operate together, whereby multiple anode bodies may be formed in parallel on the same apparatus.

12. A method as claimed in claim 1, wherein the valve action material comprises a conductive niobium sub-oxide.

13. A method as claimed in claim 1, further comprising sintering the anode body.

14. A method as claimed in claim 13, wherein the lubricant is removed from the anode body during sintering.

15. A method as claimed in claim 1, wherein the adsorbent material includes a foam.

16. A method as claimed in claim 15, wherein the foam includes a first layer of finely-pored open cell foam and a second layer of coarsely-pored open cell foam.

17. A method of manufacturing solid state capacitors from valve action material comprising the steps of:
   forming a porous anode body by a method according to claim 1,
   forming a dielectric layer on an exposed surface of the anode body,
   forming a cathode layer on the dielectric layer and
   forming a cathode terminal in electrically conducting contact with the cathode layer and an anode terminal in electrically conducting contact with the anode body.

* * * * *